US006493988B1

(12) United States Patent
Johnson

(10) Patent No.: US 6,493,988 B1
(45) Date of Patent: Dec. 17, 2002

(54) BAIT STATION WITH INTERNAL CARD HOLDER

(75) Inventor: Daniel C. Johnson, Madison, WI (US)

(73) Assignee: Bell Laboratories, Inc., Madison, WI (US)

(*) Notice: Subject to any disclaimer, the term of this patent is extended or adjusted under 35 U.S.C. 154(b) by 0 days.

(21) Appl. No.: 09/905,648

(22) Filed: Jul. 13, 2001

(51) Int. Cl.[7] .............................................. A01M 25/00
(52) U.S. Cl. ...................................................... 43/131
(58) Field of Search ......................................... 43/131

(56) References Cited

U.S. PATENT DOCUMENTS

| | | | |
|---|---|---|---|
| 2,420,021 A | | 5/1947 | Straubel et al. |
| 2,540,718 A | | 2/1951 | Duskin |
| 5,040,327 A | | 8/1991 | Stack et al. |
| D349,927 S | * | 8/1994 | Orsos ........................... D20/43 |
| 5,513,749 A | * | 5/1996 | Simmons .................. 206/308.1 |
| D385,611 S | * | 10/1997 | Prince et al. .............. D22/119 |
| 5,806,237 A | | 9/1998 | Nelson et al. |
| 5,857,286 A | * | 1/1999 | Doucette ..................... 43/131 |
| 5,984,093 A | * | 11/1999 | Frick ........................ 206/308.1 |
| 6,047,819 A | | 4/2000 | Borst |
| 6,082,042 A | * | 7/2000 | Issitt ........................... 229/116 |

OTHER PUBLICATIONS

"Thirty Mice, No Winding." Pest Control, Aug. 1995, at p. 83.

* cited by examiner

Primary Examiner—Kurt Rowan
Assistant Examiner—Bethany L Griles
(74) Attorney, Agent, or Firm—Lathrop & Clark LLP

(57) ABSTRACT

A plastic lid is hinged to a rodent bait containing base. A card holder protrudes from the inside surface of a lid upper wall. Tabs extend inwardly from two side rails extending from the inside surface, with a flexible service record card being retained between the tabs and the inside surface. Inadvertent dislodgment of the card from between the side rails is prevented by front and rear members. The card is readily removed from the card holder by being flexed and extracted over the front member. The tabs may have beveled front surfaces to facilitate insertion of the card. The card is marked with indicia to indicate the service history of the bait station.

10 Claims, 4 Drawing Sheets

BAIT STATION WITH INTERNAL CARD HOLDER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates generally to rodent bait stations and more particularly to bait stations having some provision for maintaining a record of the service history in Rodent bait stations are closed containers which dispense rodent bait containing rodenticide. The stations have openings which allow the free passage of targeted rodents, but are small enough to prevent children, pets, and other nontargeted species from having access to the bait.

A facility suffering from a rodent infestation will be provided with one or more rodent bait stations positioned along the paths which rodents frequent. Typically, a certain number of bait stations will be permanently installed. With time, the bait within the stations will be consumed, or may become soiled or damaged due to time and environmental factors. At regular intervals a pest control operator services each bait station. At each service visit a pest control operator may merely examine the contents of the station, or, if necessary, clean and replenish the station with bait. In order to provide a record of these visits, bait stations have been provided with service record labels, cards, or tags. These records usually have a writing surface with preprinted lines to receive entries noting each service visit. The labels are sometimes affixed to the exterior or interior of the station with adhesive, are attached to the station with a wire, or are loosely received within the base. However, to provide supervisors with evidence that a particular station has at least been opened on a particular visit, it is desirable to position the service record sheet within the station. Writing surfaces positioned within the base are subject to contamination from the bait and rodent droppings and dirt. Writing surfaces adhesively or permanently affixed to the lid can be difficult to write upon, as the bait stations are often fixed to the ground.

What is needed is a rodent bait station with a convenient removable connection between a service record card and the bait station lid.

SUMMARY OF THE INVENTION

The rodent bait station of this invention has a plastic lid which is hinged to a rodent bait containing base. A card holder protrudes from the inside surface of a lid upper wall. Tabs extend inwardly from two side rails extending from the inside surface, with a flexible service record card being retained between the tabs and the inside surface. In advertent dislodgment of the card from between the side rails is prevented by front and rear members. The card is readily removed from the card holder by being flexed and extracted over the front member. The tabs may have beveled front surfaces to facilitate insertion of the card. The card is marked with indicia to indicate the service history of the bait station.

It is an object of the present invention to provide a rodent bait station which releasably retains a service record card within the lid.

It is also an object of the present invention to provide a rodent bait station having a service record card which is rapidly removable and replaceable on the interior of the lid.

It is an additional object of the present invention to provide a rodent bait station with a hinged lid which securely retains a service record card throughout the motion of the lid with respect to the base.

Further objects, features and advantages of the invention will be apparent from the following detailed description when taken in conjunction with the accompanying drawings.

DESCRIPTION OF THE PREFERRED EMBODIMENTS

Referring more particularly to FIGS. 1–5, wherein like numbers refer to similar parts, a bait station 20 and a service record card 22 for use therein are shown. The service record card 22 is a thin flexible sheet member formed, for example, of a die cut plastic, card, or paper sheet. The service record card 22 has a surface suited to receive writing, and is preferably preprinted with the outlines of a calendar or table providing a convenient location for a pest control operator to make notations indicating service of the bait station 20. The preprinted outlines and notations comprise indicia 24 which delineate a reviewable record of the frequency of service of the bait station 20. A conventional card having a punched hole for attachment by a wire to the exterior of a bait station may be used, or the punched hole may be omitted as illustrated.

Figure 1:
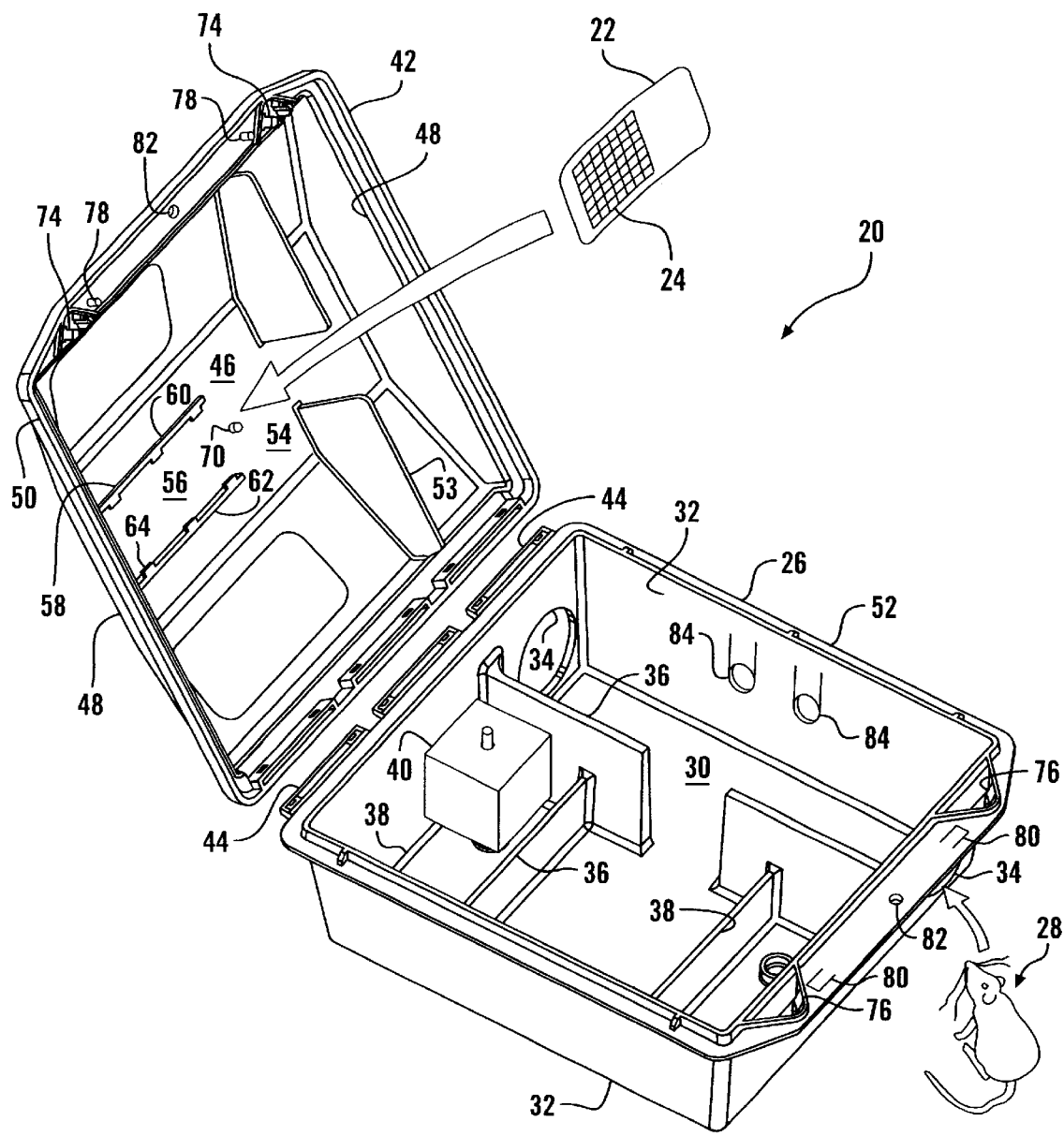
FIG. 1 is an exploded isometric view of the bait station of this invention and the service record card for use with the bait station.

As shown in FIG. 1, the bait station 20 has an upwardly opening molded plastic base 26 which is dimensioned to accommodate the targeted rodent 28. The base 26 may be, for example, about 11 inches on a side to accommodate rats. The base 26 has a bottom wall 30 with upwardly extending side walls 32. Two circular rodent openings 34 are formed in opposed base side walls 32. Interior walls 36 extend upwardly from the bottom wall 30 and define a rodent passageway extending between the rodent openings 34 and two bait containment compartments 38. The bait containment compartments retain bait 40 for consumption by targeted animals. The bait 40, although shown generically as a cube, may be in the form of extruded bait units such as those disclosed in U.S. Pat. No. 5,044,113, the disclosure of which is incorporated by reference herein. For ease in cleaning the base 26, a single sheet thermoformed tray, not shown, may be positioned within the base to overlie the bottom wall and the interior walls 36. Such a tray would have openings which align with the rodent openings 34 and would support rodent bait within the compartments.

A lid 42 is connected to the base 26. The lid may be integrally formed with the base 26, or, as shown, may be formed as a separate part with a snap connection to the base. The lid 42 is preferably connected to the base along one or several hinge segments 44, which permits the lid to be pivoted between a first position in which the lid covers the base 26, and a second position which reveals the base for servicing. The lid 42 has an upper wall 46 from which side walls 48 extend. The lid side walls 48 terminate in a lid flange 50 which, in the lid closed position, overlies a base flange 52 which extends outwardly from the base side walls 32. Two barriers 53 extend downwardly from the lid upper wall 46. The lid upper wall 46 is preferably formed with several segments for stiffness and shedding of dust and moisture. A central segment 54 of the upper wall 46 is substantially planar and extends parallel to the bottom wall 30 when the lid is closed on the base 26. The lid upper wall 46 has an inside surface 56 which faces the base 26 when the lid is closed on the base. The inside surface 56 of the lid upper wall 46 is readily accessible when the lid is opened.

Figure 2:
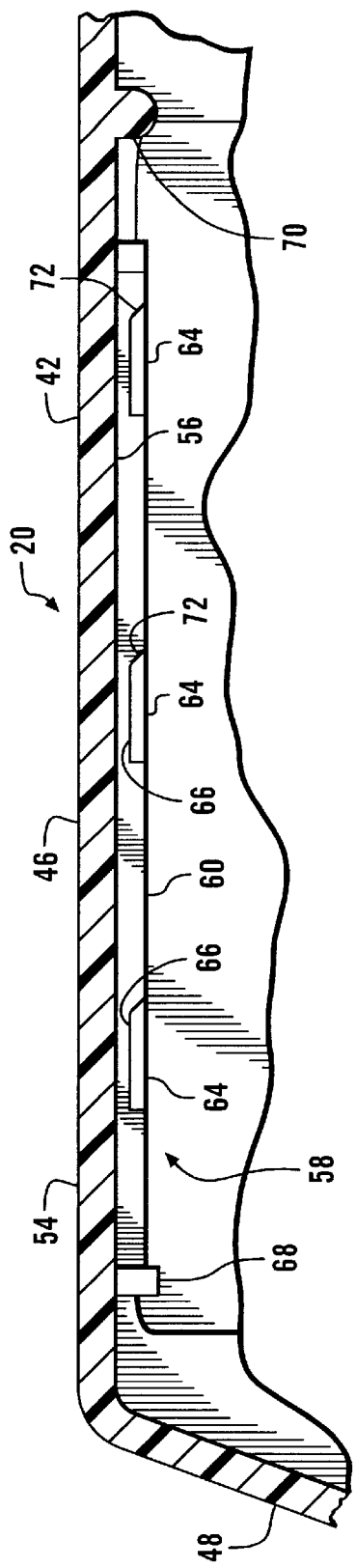
FIG. 2 is an enlarged fragmentary cross-sectional view of the bait station of FIG. 1, taken along section line 2—2.
Figure 3:
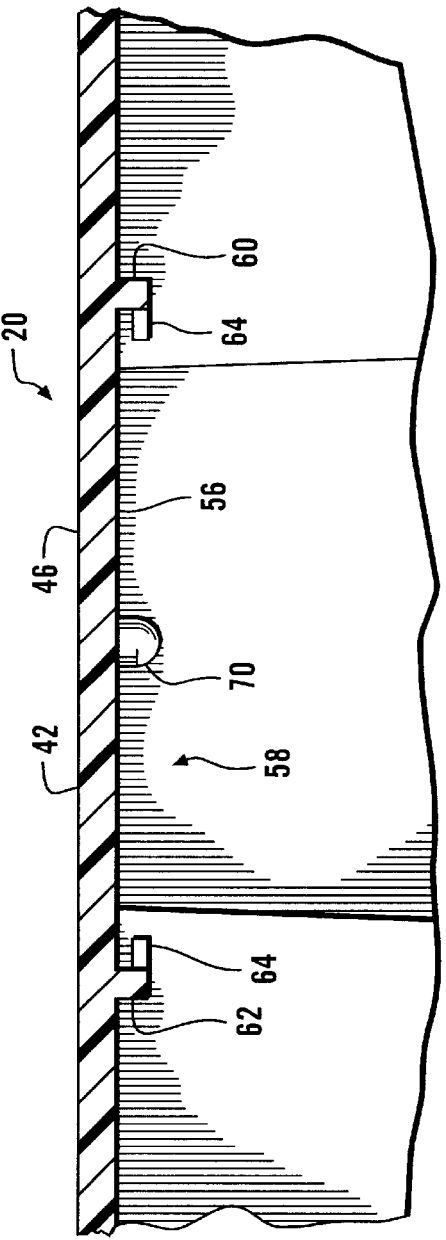
FIG. 3 is an enlarged fragmentary cross-sectional view of the bait station of FIG. 1 taken along section line 3—3.

A card holder 58 is formed on the lid 42 to retain the service record card 22 throughout the range of movement of the lid with respect to the base 26. The card holder 58 is preferably integrally molded with the lid 42. As shown in FIG. 5, a first side rail 60 projects from the upper wall inside surface 56 approximately one-quarter inch. A second side rail 62 is positioned sidewardly from the first side rail the width of the service record card 22, and also projects from the upper wall inside surface 56. As shown in FIGS. 2 and 3, three tabs 64 extend from each side rail 60, 62. Each tab 64 extends inwardly from the side rail about 1/16 inch toward the opposing side rail. Each tab 64 has portions spaced from the upper wall inside surface 56 to define a recess 66, shown in FIG. 2. The recesses 66 located between the tabs 64 and the upper wall inside surface 56 receive the edges of the service record card 22, as shown in FIG. 4.

A rear member 68 protrudes from the upper wall inside surface 56 adjacent each side rail 60, 62, and at a position between the first side rail 60 and the second side rail 62. The rear members 68 may be formed as right angle extensions from the side rails and may be the same height as the side rails, or of a slightly greater height, for example an additional projection from the side rail of about 0.62 inches. It should be noted that the side rails need not be continuous, nor need they extend the entire length of the service record card.

Figure 4:
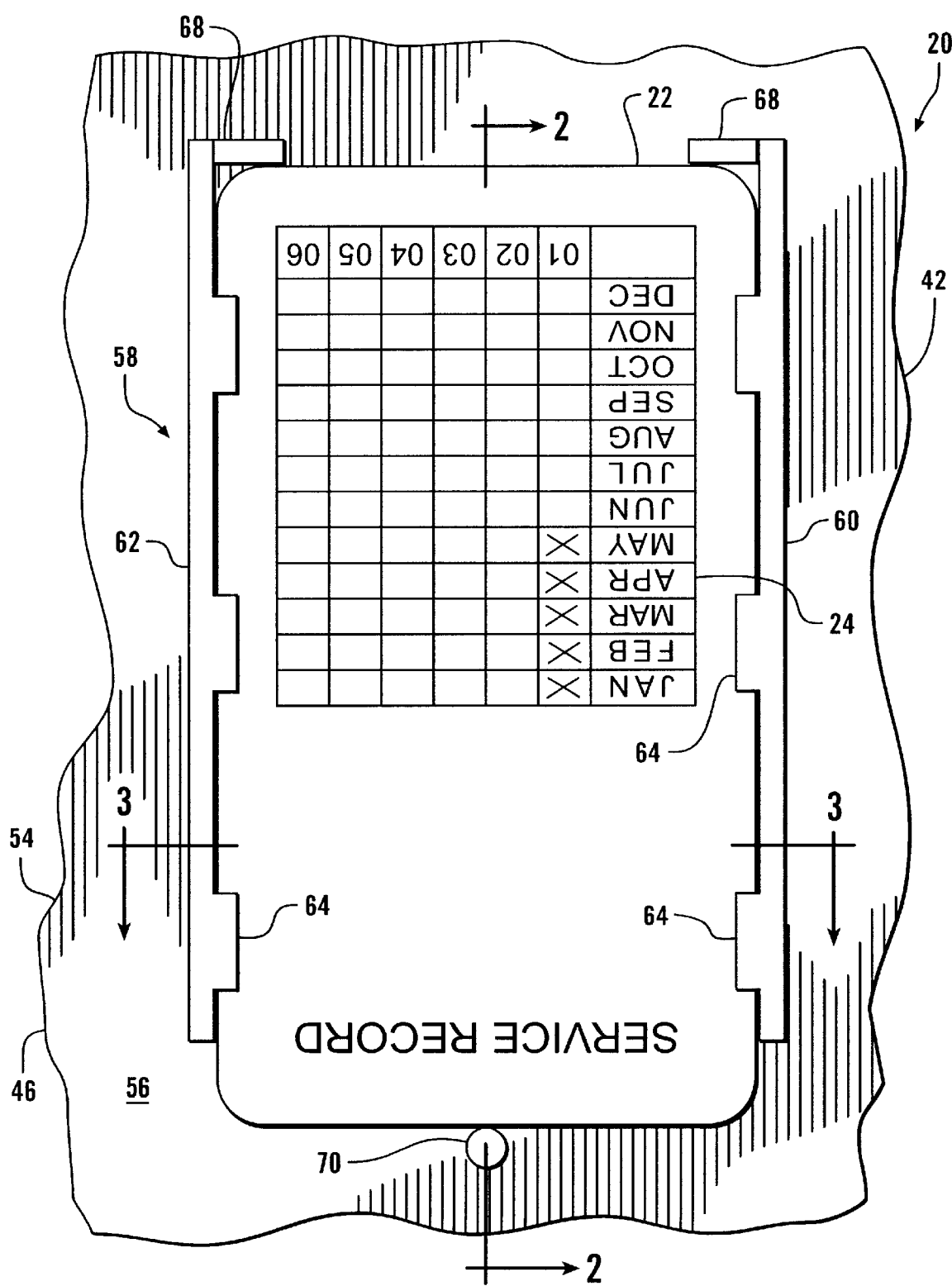
FIG. 4 is a fragmentary plan view of the card holding structure of the lid of the bait station of FIG. 1.
Figure 5:
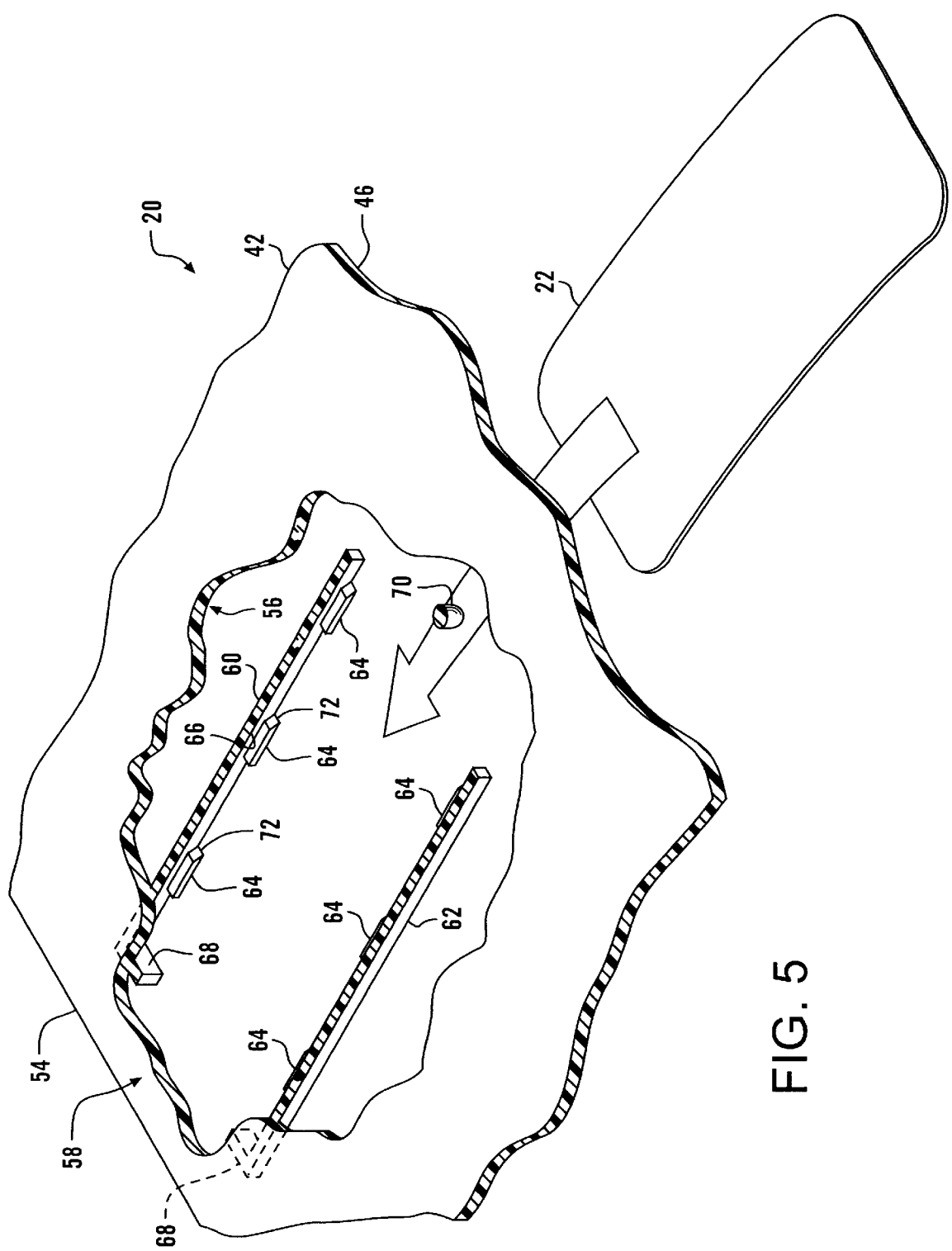
FIG. 5 is a fragmentary isometric view, cut away in section, of the bait station and service card of FIG. 1.

A front member 70, as shown in FIG. 4, is spaced from the rear members 68 approximately the length of the service record card 22. The front member 70 is positioned between the first side rail 60 and the second side rail 62 and protrudes from the upper wall inside surface 56 a distance approximately the same as, or slightly greater than, the protrusion of the side rails, for example an additional 0.062 inches. The front member 70 may be approximately semispherical in shape and is preferably centered between the side rails 60, 62. Or, when the front member has a greater height than the side rails, as illustrated, the front member 70 may be cylindrical with a semispherical top.

To facilitate insertion of the service record card 22 beneath the side rail tabs 64, each tab is preferably formed with a front bevel surface 72, as shown in FIG. 2. The front bevel surface 72 is inclined with respect to the upper wall inside surface 56 and faces the front member 70 and the upper wall inside surface. As shown in FIG. 5, when the service record card 22 is inserted within the card holder 58, the card must pass over the front member 70 and then beneath the tabs 64 until further insertion is blocked by the rear members 68. Once inserted, the service record card 22 is removably retained between the rear members and the front member, between the side rails 60, 62, and between the tabs 64 and the inside surface of the upper wall. The card 22 will be retained on the lid 42 while the lid is pivoted between the closed and opened positions. Nevertheless, the card 22 is readily flexed to pass over the front member 70 for convenient extraction from the card holder 58 and removal from attachment to the lid 42. Once removed, any notations on the service record card are rapidly made, and the card 22 is returned to its position within the holder 58 without resort to any ties, fasteners, or adhesives. Likewise, when the time comes to replace the card with a new one, this is readily done.

As shown in FIG. 1, the lid is preferably provided with two pairs of barbed prongs 74 which engage with ledges 76 positioned along the base flange 52. The prongs 74 retain the lid in a closed position, and restrict tampering with the bait station 20. A pest control operator having a two-pronged key, however, may readily open the station. Holes 82 are provided in the base and the lid to allow the lid to be locked to the base. In addition, side mounting holes 84 are formed in a side wall to allow the bait station to be mounted or secured sidewardly.

As shown in FIG. 1, the lid may be provided with an integrally molded pin 78 which protrudes downwardly from the lid flange 50 about 1/8 inch. An integrally molded spring 80 is formed on the base flange 52 beneath each pin 78. The spring is a segment of plastic which is surrounded by a slot on three sides, such that the spring 80 is resiliently deformed downwardly when the lid is latched to the base. However, when the key is inserted to free the prongs 74 from the ledges 76, the springs 80 will push up on the pins 78, causing the lid flange to lift up slightly from the base flange, facilitating opening of the bait station.

It should be noted that the bait station may accommodate an interior mechanical rodent trap, such as is disclosed in U.S. patent application Ser. No. 09/560,382, filed Apr. 28, 2000, the disclosure of which is incorporated by reference herein.

It is understood that the invention is not limited to the particular construction and arrangement of parts herein illustrated and described, but embraces all such modified forms thereof as come within the scope of the following claims.

I claim:

1. A rodent bait station comprising:
an upwardly opening base having at least one rodent opening providing access to a bait containment compartment defined within the base;
a lid connected to the base and having an upper wall and opposed side walls which extend from the upper wall, wherein the lid is movable between a first position which covers the base, and a second position which reveals the base, wherein the lid upper wall has an inside surface which faces the base in the first position, and which is readily accessible in the second position;
a flexible service record card, having indicia thereon;
a first side rail which projects from the upper wall inside surface;
a second side rail spaced sidewardly from the first side rail and projecting from the upper wall inside surface;
at least one tab extending from the first side rail toward the second side rail, and at least one tab extending from the second side rail towards the first side rail, wherein each tab has portions spaced from the upper wall inside surface to define a recess between the tab portions and the upper wall inside surface;
at least one rear member protruding from the upper wall inside surface at a position between the first side rail and the second side rail; and at least one front member spaced from the rear member and positioned between the first side rail and the second side rail, wherein the at least one front member is spaced from the lid side walls to permit the insertion of the service record card, the at least one front member protruding from the upper wall inside surface, wherein the service record card is received between the first side rail and the second side rail, the service record card extending into the recesses, the service record card being removably retained between the at least one rear member and the at least one front member, such that the service record card is retained on the lid while the lid is moved between the first position and the second position, and wherein the service record card may be flexed to be extracted over the at least one front member for removal from attachment to the lid.

2. A rodent bait station comprising:

an upwardly opening base having at least one rodent opening providing access to a bait containment compartment defined within the base;

a lid connected to the base and having an upper wall, wherein the lid is movable between a first position which covers the base, and a second position which reveals the base, wherein the lid upper wall has an inside surface which faces the base in the first position, and which is readily accessible in the second position;

a flexible service record card, having indicia thereon;

a first side rail which projects from the upper wall inside surface;

a second side rail spaced sidewardly from the first side rail and projecting from the upper wall inside surface;

at least one tab extending from the first side rail toward the second side rail, and at least one tab extending from the second side rail towards the first side rail, wherein each tab has portions spaced from the upper wall inside surface to define a recess between the tab portions and the upper wall inside surface;

at least one rear member protruding from the upper wall inside surface at a position between the first side rail and the second side rail; and at least one front member spaced from the rear member and positioned between the first side rail and the second side rail, the at least one front member protruding from the upper wall inside surface, wherein the service record card is received between the first side rail and the second side rail, the service record card extending into the recesses, the service record card being removably retained between the at least one rear member and the at least one front member, such that the service record card is retained on the lid while the lid is moved between the first position and the second positions and wherein the service record card may be flexed to be extracted over the at least one front member for removal from attachment to the lid, wherein each tab has a front bevel surface which is inclined with respect to the upper wall inside surface and which faces the at least one front member and the upper wall inside surface, the tab front bevel surfaces aiding the insertion of the service record card beneath the tabs.

3. The rodent bait station of claim 1 wherein a rear member extends from each of the first side rail and the second side rail.

4. The rodent bait station of claim 1 wherein the at least one front member is centered between the first side rail and the second side rail.

5. A rodent bait station comprising;

an upwardly opening base having at least one rodent opening providing access to a bait containment compartment defined within the base;

a lid connected to the base and having an upper wall, wherein the lid is movable between a first position which covers the base, and a second position which reveals the base, wherein the lid upper wall has an inside surface which faces the base in the first position, and which is readily accessible in the second position;

a flexible service record card, having indicia thereon;

a first side rail which projects from the upper wall inside surface;

a second side rail spaced sidewardly from the first side rail and projecting from the upper wall inside surface;

at least one tab extending from the first side rail toward the second side rail, and at least one tab extending from the second side rail towards the first side rail, wherein each tab has portions spaced from the upper wall inside surface to define a recess between the tab portions and the upper wall inside surface;

at least one rear member protruding from the upper wall inside surface at a position between the first side rail and the second side rail; and at least one front member spaced from the rear member and positioned between the first side rail and the second side rail, the at least one front member protruding from the upper wall inside surface, wherein the at least one front member comprises a semispherical protrusion, and wherein the service record card is received between the first side rail and the second side rail, the service record card extending into the recesses, the service record card being removably retained between the at least one rear member and the at least one front member, such that the service record card is retained on the lid while the lid is moved between the first position and the second position, and wherein the service record card may be flexed to be extracted over the at least one front member for removal from attachment to the lid.

6. A rodent bait station comprising:

an upwardly opening base having at least one rodent opening providing access to a bait containment compartment defined within the base;

a lid hinged to the base and having an upper wall and opposed side walls which extend from the upper wall, wherein the lid is pivotable between a first position which covers the base, and a second position which reveals the base, wherein the lid upper wall has an inside surface which faces the base in the first position, and which is readily accessible in the second position;

a service record card adapted to receive writing thereon, and having a width and a length;

a first side rail and a second side rail which project from the upper wall inside surface and which are spaced from the lid side walls, the second side rail being spaced from the first side rail at least the width of the service record card, the service record card being received between the side rails;

tabs which extend from the side rails over the service record card, wherein each tab has portions spaced from the upper wall inside surface to define a recess between the tab portions and the upper wall inside surface, the service record card extending within the recesses;

at least one rear member protruding from the upper wall inside surface at a position between the first side rail and the second side rail; and a front member spaced from the rear member at least the length of the service record card, and positioned between the first side rail and the second side rail, the front member protruding from the upper wall inside surface, wherein the front member is spaced from the lid side walls to permit the insertion of the service record card, the service record card being removably retained between the at least one rear member and the front member, such that the service record card is retained on the lid while the lid is pivoted between the first position and the second position, and wherein the service record card may be extracted over the front member for removal from attachment to the lid.

7. A rodent bait station comprising:

an upwardly opening base having at least one rodent opening providing access to a bait containment compartment defined within the base;

a lid hinged to the base and having an upper wall, wherein the lid is pivotable between a first position which covers the base, and a second position which reveals the base, wherein the lid upper wall bas an inside surface which faces the base in the first position, and which is readily accessible in the second position;

a service record card adapted to receive writing thereon, and having a width and a length;

a first side rail and a second side rail which project from the upper wall inside surface, the second side rail being spaced from the first side rail at least the width of the service record card, the service record card being received between the side rails;

tabs which extend from the side rails over the service record card, wherein each tab has portions spaced from the upper wall inside surface to define a recess between the tab portions and the upper wall inside surface, the service record card extending within the recesses;

at least one rear member protruding from the upper wall inside surface at a position between the first side rail and the second side rail; and a front member spaced from the rear member at least the length of the service record card, and positioned between the first side rail and the second side rail, the front member protruding from the upper wall inside surface, the service record card being removably retained between the at least one rear member and the front member, such that the service record card is retained on the lid while the lid is pivoted between the first position and the second position, and wherein the service record card may be extracted over the front member for removal from attachment to the lid, wherein each tab has a front bevel surface which is inclined with respect to the upper wall inside surface and which faces the front member and the upper wall inside surface, the tab front bevel surfaces aiding the insertion of the service record card beneath the tabs.

8. The rodent bait station of claim 6 wherein a rear member extends from each of the first side rail and the second side rail.

9. The rodent bait station of claim 6 wherein the front member is centered between the first side rail and the second side rail.

10. A rodent bait station comprising:

an upwardly opening base having at least one rodent opening providing access to a bait containment compartment defined within the base;

a lid hinged to the base and having an upper wall, wherein the lid is pivotable between a first position which covers the base, and a second position which reveals the base, wherein the lid upper wall has an inside surface which faces the base in the first position, and which is readily accessible in the second position;

a service record card adapted to receive writing thereon, and having a width and a length;

a first side rail and a second side rail which project from the upper wall inside surface, the second side rail being spaced from the first side rail at least the width of the service record card, the service record card being received between the side rails;

tabs which extend from the side rails over the service record card, wherein each tab has portions spaced from the upper wall inside surface to define a recess between the tab portions and the upper wall inside surface, the service record card extending within the recesses;

at least one rear member protruding from the upper wall inside surface at a position between the first side rail and the second side rail; and a front member spaced from the rear member at least the length of the service record card, and positioned between the first side rail and the second side rail, the front member protruding from the upper wall inside surface, wherein the front member comprises a semispherical protrusion, and the service record card being removably retained between the at least one rear member and the front member, such that the service record card is retained on the lid while the lid is pivoted between the first position and the second position, and wherein the service record card may be extracted over the front member for removal from attachment to the lid.

* * * * *

UNITED STATES PATENT AND TRADEMARK OFFICE
CERTIFICATE OF CORRECTION

PATENT NO.    : 6,493,988 B1                                       Page 1 of 1
DATED         : December 17, 2002
INVENTOR(S)   : Daniel C. Johnson It is certified that error appears in the above-identified patent and that said Letters Patent is hereby corrected as shown below:

Column 1,
Line 58, "In advertent" should be -- Inadvertent --

Column 5,
Line 53, "positions" should be -- position, --

Column 7,
Line 22, "bas" should be -- has --

Signed and Sealed this

Twenty-ninth Day of April, 2003

JAMES E. ROGAN
*Director of the United States Patent and Trademark Office*